Patented May 12, 1942

2,282,712

UNITED STATES PATENT OFFICE 2,282,712

RECOVERY OF HYDROGEN HALIDES

William Engs, Piedmont, and Henry W. de Jong, Berkeley, Calif., assignors to Shell Development Company, San Francisco, Calif., a corporation of Delaware No Drawing. Application April 30, 1940, Serial No. 332,610

17 Claims. (Cl. 23—154)

The present invention relates to the recovery of hydrogen halides, and more particularly pertains to a novel, efficient and economical process for the separation and recovery of hydrogen halides in an anhydrous or substantially anhydrous state from mixtures containing these hydrogen halides and organic compounds of the class of saturated and/or unsaturated hydrocarbons and halogenated derivatives thereof.

There is a large number of technical and industrial processes in which the intermediate and/or final reaction products comprise, contain or consist of mixtures of organic compounds and one or more hydrogen halides. For example, as disclosed and claimed in U. S. Patents 2,130,084 and 2,167,927, halo-substitution occurs when aliphatic unsaturated hydrocarbons containing primary and/or secondary unsaturated carbon atoms are subjected to the action of a halogen at elevated temperatures in the order of from about 200° C. to about 700° C. The vaporous reaction mixture resulting from such halo-substitution contains unsaturated products of halo-substitution, hydrogen halide and some unreacted unsaturated hydrocarbons. The hydrogen halide in these reaction products is produced by the interaction of one-half of the reacting halogen with the hydrogen atoms liberated as a result of the halo-substitution reaction. Also, the catalytic as well as the non-catalytic thermal dehydrohalogenation of halogenated hydrocarbons yields reaction mixtures containing the unreacted halogenated hydrocarbons, partially and/or completely dehydrohalogenated unsaturated hydrocarbons and hydrogen halide. The halogenated hydrocarbons thus subjected to partial and/or complete dehydrohalogenation may be of aliphatic or alicyclic character, or may comprise straight chain or ring structures containing alkyl, aryl, aralkyl or similar radicals attached thereto. Also, such halogenated primary materials may contain one or more halogen atoms per molecule. Therefore, the resulting mixtures will contain the hydrogen halide, any and/or all of these halogenated hydrocarbons, as well as the partially and/or completely dehydrohalogenated derivatives thereof.

The hydrogen halides, such as hydrogen chloride, hydrogen bromide or hydrogen iodide, produced as products or by-products in the above-outlined and other chemical reactions, are valuable and may be economically employed in a number of chemical reactions, particularly if it were possible to separate and recover such hydrogen halides economically in an anhydrous or at least substantially anhydrous state from mixtures thereof with organic compounds, such as halogenated and/or non-halogenated hydrocarbons. Also, when various organic compounds are subjected to reactions involving halo-substitution or the like, i. e. reactions in which hydrogen halides are formed as by-products, it is usually desirable, if not essential, to separately remove such hydrogen halides at some stage of the operation of such process or processes. In fact, in some cases it is highly desirable to remove these by-products from the reaction mixture substantially as soon as formed. For example, when halogenated aliphatic and/or cyclo-aliphatic hydrocarbons are subjected to thermal dehydrohalogenation at an elevated temperature and in the presence or absence of catalysts which promote such dehydrohalogenation, the hydrogen halide or halides thus formed should preferably be removed from the reaction products substantially as soon as they are formed because the continued contact of the hydrogen halide or halides with the unsaturated hydrocarbons (produced as a result of the dehydrohalogenation reaction) may cause a number of side-reactions, such as the addition of the hydrogen halide molecules to the unsaturated carbon atoms of the partially and/or completely dehydrohalogenated unsaturated hydrocarbons.

When the organic compounds present in mixtures thereof with the hydrogen halides have relatively high boiling points, and particularly when such mixtures consist of a hydrogen halide and of normally liquid organic compounds, such as the normally liquid hydrocarbons, the separation of these two components of the mixture into its constituents may be readily effected for example by ordinary cooling. However, such methods are unsuitable for the separation of hydrogen halides from mixtures containing them and relatively low boiling organic compounds, such as the low boiling saturated and unsaturated aliphatic and/or alicyclic hydrocarbons, and their partially halogenated derivatives. This is due to the fact that excessive refrigeration would be necessary particularly when the mixtures to be treated comprise the hydrogen halides (which have very low boiling points) and the normally gaseous hydrocarbons, such as propane, propylene, butane, butylenes, butadienes, and the like.

Heretofore, the separation of the hydrogen halide from mixtures of the type described above, as well as from mixtures thereof with other organic compounds, was effected either by washing or scrubbing the mixtures in a gaseous or vapor state with water or an aqueous solution which dissolves the hydrogen halide or halides while leaving the organic compounds substantially unaffected, or by contacting the hydrogen halide-containing mixtures with a basic or basic-acting agent capable of reacting with and/or neutralizing the hydrogen halides.

The known methods for the removal of the hydrogen halide from mixtures thereof with organic compounds are undesirable and uneconomical for several reasons. For example, when basic materials or agents, such as soda lime or the like, are employed, the resulting reaction mixture contains a neutral salt obtained by the interaction of the basic material with the hydrogen halide. Aside from the added expense incurred by reason of the use of these basic or basic-acting materials, the described process is undesirable and uneconomical because of the total loss of the hydrogen halide which, as stated, is converted to a neutral salt. On the other hand, when the vaporous mixtures containing hydrogen halides are scrubbed with water or an aqueous solution, the hydrogen halide is, at best, separated in the form of a diluted aqueous solution. The recovery of an anhydrous or substantially anhydrous hydrogen halide from such aqueous solutions is difficult, relatively costly and incomplete. For example, mere distillation is inoperative since water forms a maximum boiling mixture with the hydrogen halides, so that the condensed overhead fraction is never anhydrous. Also, the concentrated aqueous hydrogen halide solutions are highly corrosive, thus necessitating the use of special and costly corrosion resistant equipment.

It is therefore the main object of the present invention to avoid the defects of the processes known heretofore and to provide a process whereby hydrogen halides may be effectively and economically separated and recovered in an anhydrous or substantially anhydrous state from mixtures in which a hydrogen halide or mixtures of hydrogen halides are present together with one or more organic compounds. A further object is to separate anhydrous or substantially anhydrous hydrogen halides from mixtures thereof with organic compounds of the type of saturated and/or unsaturated hydrocarbons and/or halogenated derivatives thereof. A still further object is to provide a process whereby mixtures comprising or containing a hydrogen halide, saturated and/or unsaturated hydrocarbons, and halogenated derivatives thereof may be effectively and economically separated into their constituent parts, the hydrogen halide being recovered substantially quantitatively and in an anhydrous state. Still another object is to provide a process whereby hydrogen halide may be economically recovered in an anhydrous state from mixtures thereof with low boiling saturated or unsaturated aliphatic and/or alicyclic hydrocarbons and/or halogenated derivatives thereof, without the necessity of chilling or refrigerating said mixtures to the excessively low temperatures at which such hydrocarbons are in a liquid state. Further objects of the present invention will be obvious from the following description.

It has now been discovered that the above and other objects may be realized by subjecting mixtures containing organic compounds and a hydrogen halide or halides to the action of an anhydrous liquid or liquefied material which, under the operating conditions, is a good solvent for the hydrogen halides and a poor solvent for the organic compounds present in the mixture to be treated. It has been further discovered that hydrogen halides may be effectively, economically and substantially quantitatively separated from mixtures thereof with gaseous or vaporous organic compounds by subjecting such mixtures to the scrubbing action of an anhydrous liquid material under conditions whereby the hydrogen halides are substantially quantitatively absorbed by such solvent while the remaining organic compounds are substantially unaffected. After removal of the enriched solvent, the hydrogen halide may then be recovered therefrom by any of the well known methods which will be described more fully hereinbelow. More specifically stated, the invention resides in the scrubbing of gaseous or vaporous mixtures containing hydrogen halides, and particularly mixtures thereof with gaseous or vaporous hydrocarbons and/or halogenated derivatives thereof, with an anhydrous liquid oxy-compound under conditions whereby the hydrogen halide or halides are selectively absorbed in such compound while the organic compounds remain substantially unaffected.

Suitable anhydrous materials or substances which may be employed as the scrubbing agent for the selective absorption and separation of hydrogen halides from mixtures thereof with organic compounds, such as the saturated and unsaturated aliphatic and/or alicyclic hydrocarbons and halogenated derivatives thereof, include: alcohols, particularly saturated primary and secondary alcohols, carboxylic acids, acid esters, ethers, di-ethers and halogenated derivatives thereof. The following list shows some of the types of the liquid anhydrous oxy-compounds which may be effectively employed as scrubbing agents or solvents:

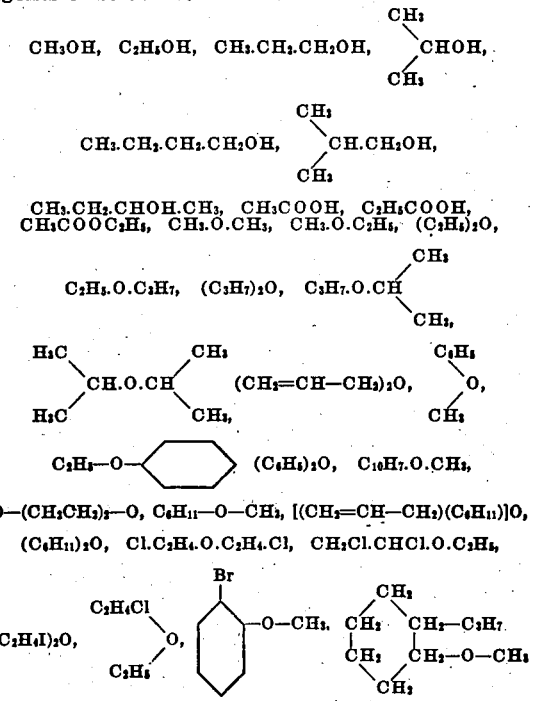

The ethers and halogenated derivatives thereof are particularly suitable for the selective scrubbing of hydrogen halides from gaseous or vaporous mixtures thereof with organic compounds. Therefore, in one of its specific embodiments the invention comprises a process wherein gaseous or vaporous mixtures containing or comprising organic compounds and the hydrogen halide or halides are scrubbed or washed with the aforementioned ethers under conditions whereby most, if not all, of the hydrogen halide content of the gaseous mixture is dissolved by this solvent, while the vaporous or gaseous organic compounds originally present in the treated mixtures remain substantially unaffected. By a proper control of operating conditions, such as temperature, rates of introduction of scrubbing liquid or solvent, etc., which conditions will be described more fully hereinbelow, it is possible to separate the hydrogen halide from a gaseous or vaporous mixture containing the hydrogen halide and the organic compounds of the type described herein, said separation being effected by scrubbing the gaseous or vaporous mixture with the above-described liquid anhydrous scrubbing agents, such as oxy-compounds, which are capable, at least under the operating conditions, to dissolve the hydrogen halide in preference to the hydrocarbons.

As noted, the ethers are particularly suitable as the scrubbing agent or solvent for the selective removal and recovery of anhydrous or substantially anhydrous hydrogen halide from mixtures containing it. This discovery was highly unexpected and unpredictable since it is well known that organic compounds, such as saturated and unsaturated hydrocarbons, as well as their halogenated derivatives, are readily soluble in ethers and halogenated derivatives thereof. The term "ether" as employed herein and in the appended claims includes saturated and unsaturated aliphatic, aromatic and alicyclic ethers, which may be symmetrical or asymmetrical, as well as cyclo-aliphatic di-ethers. The ethers which may be employed as the scrubbing agents or solvents in accordance with one phase of the present invention and which fall within the aforementioned definition of this word, may have like or similar radicals attached to the oxygen atom. However, these radicals may also vary considerably both in size (i. e. number of carbon atoms) and in structure. For example, one of such radicals may be saturated, while the other is unsaturated. Also, the ether may have an alkyl radical and a cyclo-aliphatic or aromatic radical attached to the oxygen atom. Furthermore, either or both of these ether radicals may be halogen or like substituents.

As stated, liquid anhydrous substances, and particularly liquid anhydrous oxy-compounds such as the ethers defined above, may be employed as the selective scrubbing agents or solvents for the separation and recovery of hydrogen halides in an anhydrous or substantially anhydrous state from gaseous or vaporous mixtures containing hydrogen halides and organic compounds, such as hydrocarbons and the halogenated hydrocarbons. However, there is no intention of considering all of these anhydrous substances, or even all of the ethers, as equivalents of each other since their selective activity and other properties will vary within relatively wide limits. For example, with particular reference to ethers, some of these scrubbing agents, as this will be shown hereinbelow, have a greater degree of selectivity than others. Also, some of the ethers, such as ethers containing branched chain radicals, have a greater tendency to react with the hydrogen halide than the ethers with straight chain aliphatic radicals. Furthermore, unsaturated ethers, also possessing the tendency to react with the hydrogen halide (e. g. via addition), may require somewhat lower temperatures than the more stable saturated aliphatic or alicyclic ethers or their halogenated derivatives. Similar parallels may be drawn as to degrees of selectivity and other properties of the different oxy-compounds and the like which fall within the general group of liquid anhydrous substances which may be employed as scrubbing agents. However, it may be generally stated that all such substances, and particularly all of the ethers (which term includes halogenated ethers and di-ethers, such as the cyclo-aliphatic di-ethers), when employed under suitable operating conditions, have the power of selectively absorbing hydrogen halides in preference to organic compounds of the defined class, and these substances may therefore be considered as falling within the class of compounds which may be employed as the scrubbing agent in the process of the present invention.

In accordance with the process of the present invention, the separation of the hydrogen halide from gaseous or vaporous mixtures containing the same may be effected by a batch, intermittent or continuous scrubbing of such mixtures with one or more of the above-defined liquid anhydrous substances or selective solvents. Depending on the absorptive power of the particular solvent employed, as well as on its degree of selectivity, etc., it may be necessary to vary the quantity of solvent employed, as well as the temperture, pressure and/or other operating conditions. For instance, it must be remembered that although the above-defined anhydrous materials or substances, and particularly the oxy-compounds and halogenated oxy-compounds, such as the ethers and halogenated derivatives thereof, have preferential selectivity for the hydrogen halides, all of these scrubbing agents will, at least to a certain degree, also absorb the hydrocarbons or the like with which the hydrogen halides are intermixed. Therefore, for example, in the case of a countercurrent washing of a gaseous mixture containing hydrocarbons and a hydrogen halide, if the rate of feed of the scrubing liquid is very low and insufficient under given pressure and temperature conditions, substantially all of the hydrocarbons will pass through the scrubber, the gaseous mass thus leaving the scrubber also containing more or less large percentages of the hydrogen halide originally present in the treated mixture. In other words, a part of the hydrogen halide will remain unabsorbed by the scrubbing liquid. On the other hand, other conditions being equal, an excessive rate of throughput of the scrubbing agent, although dissolving all or substantially all of the hydrogen halide, may also absorb an excessive proportion of the organic compounds. Also, generally speaking, an increase in the operating temperature will decrease the selectivity of a given scrubbing agent. Therefore, each scrubbing agent of the above-defined class will have optimum conditions, such as temperature, pressure, ratio of solvent to mixture to be treated, etc., at which the hydrogen halides are substantially all dissolved without substantial or excessive absorption by the scrubbing agent or liquid of the organic compounds. Since optimum results depend on a combination of the various variables constituting the optimum operating conditions, in order to obtain such optimum separation of the hydrogen halides it is necessary to vary the various conditions with a change in others. Thus, the optimum ratio of solvent to mixture treated will vary with the operating temperature, pressure, hydrogen halide content of the gaseous mixture treated, particular scrubbing agent employed, etc., as this is obvious to and readily determinable by anyone skilled in the art.

When gaseous or vaporous mixtures of hydrogen halides and organic compounds are scrubbed under optimum conditions with the above defined liquid anhydrous scrubbing agent, the latter absorbs the hydrogen halide while leaving the organic compounds substantially unaffected. The scrubbing agent thus enriched by the hydrogen halide absorbed during the scrubbing step, may then be removed from the scrubber either intermittently or continuously. The anhydrous or substantially anhydrous hydrogen halide may then be recovered from this enriched scrubbing agent by any of the well known methods, such as heating to a temperature sufficient to vaporize only the hydrogen halide, or by the application of a partial vacuum. This hydrogen halide is thus easily obtained in a condition in which it may be readily employed, without any further treatment, in a number of chemical reactions, such as hydrohalogenation of unsaturated hydrocarbons, etc. The anhydrous solvent or scrubbing agent stripped of the absorbed or dissolved anhydrous hydrogen halide, may be recycled, preferably after pre-cooling, back into the scrubber for the absorption and separation of hydrogen halide from further quantities of organic mixtures containing the same.

The present invention is applicable for the separation of anhydrous hydrogen halide from various types of reaction mixtures containing it. For instance, it was stated above that the products of pyrolytic dehydrohalogenation of halogenated aliphatic and/or alicyclic hydrocarbons, comprise a mixture containing hydrogen halide, unsaturated organic reaction products and unreacted organic halides. Also, reaction products obtained during the high temperature halo-substitution of unsaturated hydrocarbons, such as ethylene, propylene, butylene and the like, comprise a mixture containing the unreacted unsaturates, halo-substituted derivatives thereof and hydrogen halide. Furthermore, the halo-substitution of saturated hydrocarbons yields mixtures containing the organic compounds and the hydrogen halide. Usually, according to the present invention, it is preferable to first treat such reaction products so as to separate the organic halides. This may be accomplished by any of the well known processes, such as cooling of the reaction products to a temperature at which the organic halides are liquefied, or by scrubbing the vapors with solvents of the type of kerosene, iso-octane, isobutylene, or the like, which solvents are capable of selectively absorbing the organic halides. In the alternative, the halogenated organic compounds may be removed from the reaction mixtures by a combination of the above-outlined processes as well as by other means. The remaining gaseous or vaporous mixture, containing the hydrogen halide and saturated and/or unsaturated organic compounds, such as the saturated and/or unsaturated hydrocarbons, may then be subjected to further scrubbing in accordance with the process of the present invention. In fact, by a proper selection of the scrubbing agents and of other operating conditions, it is possible to selectively remove the hydrogen halide, the non-halogenated hydrocarbons and the halogenated hydrocarbons from mixtures comprising or containing all of these substances, this separation being effected solely or in part by scrubbing the mixture with one or more of the above-defined liquid anhydrous scrubbing agents. However, it must be noted that the present invention is particularly directed to the separation of the hydrogen halide by the scrubbing of vaporous organic mixtures containing the same with the aforementioned selective solvents, and particularly with liquid oxy-compounds and halogenated oxy-compounds, under conditions whereby a substantially quantitative absorption of the hydrogen halide is effected, while leaving the hydrocarbons substantially unabsorbed.

In order to show the operability of the above described process and the selective effect of the anhydrous scrubbing agents, such as oxy-compounds, mixtures of anhydrous hydrogen chloride and propane, as well as mixtures of anhydrous hydrogen chloride and butane, were scrubbed with various solvents, namely dioxane, dichlor ethyl ether and isopropyl ether. In all of these experiments the gaseous mixture to be treated was conveyed at substantially atmospheric pressure and at a temperature of about 25° C. into the bottom of a glass column 43 inches long and one inch in internal diameter, this column being packed with glass helices. The liquid solvent was passed through this tube countercurrently to the rising vaporous or gaseous stream. In order to determine and point out the effectiveness and the selective solubility of the different solvents under the operating conditions employed, the gases passing through the described absorber were run to a water scrubber to collect any of the unabsorbed hydrogen chloride. The remaining hydrocarbon vapors were then metered. As to the liquid phase leaving the bottom of the absorber or scrubber, this liquid was conveyed to an indirectly heated stripper for the vaporization and removal of the gases dissolved by said solvent. These gases were then conveyed through another scrubber wherein water was employed for the absorption of the hydrogen chloride unabsorbed in the first scrubber. The gases leaving this second scrubber were then metered to determine the amounts or percentages of hydrocarbons which may have been dissolved by the anhydrous solvent employed in the first scrubber. The stripped solvent, after pre-cooling to the desired temperature, was returned to the top of the first absorber or scrubber for the purpose of recovering fresh quantities of hydrogen chloride from mixtures containing the same.

The gaseous mixture containing propane and hydrogen chloride in a volumetric ratio of 2:1 was conveyed through the afore-mentioned scrubber at a rate of from about 8 to about 10 cubic feet per hour, while the rate of throughput of the scrubbing liquid was varied within a relatively wide range to determine the degree of absorption of the propane with an increase in the degree of removal or separation of the hydrogen chloride from the gaseous propane-HCl mixture. As stated, the scrubbing was effected at atmospheric pressure and at a temperature of about 25° C. Under these conditions, when operating with a given rate of throughput of dioxane, about 95% of the total hydrogen chloride was found to have been absorbed by the dioxane, while about 97.5% of the propane passed through the column unabsorbed. In other words, only about 2.5% of the total propane conveyed through the column was absorbed by the dioxane, while approximately 5% of the hydrogen chloride remained unabsorbed. When the rate of dioxane flow was increased somewhat, while maintaining the other conditions equal, all of the hydrogen chloride originally present in the mixture was found absorbed by the scrubbing liquid which also contained about 5% of the total propane conveyed through the absorber. Similar results were obtained when dioxane was employed as a scrubbing liquid for the separation of hydrogen chloride from mixtures thereof with butane. In this case the butane-HCl volumetric ratio was about 1:2 this ratio being selected since it corresponded to the hydrocarbon-HCl ratio of the gases leaving the reaction chamber when dichlor-butane is subjected to pyrolytic dehydrochlorination to butadiene. By employing an optimum feed of dioxane, it was possible to selectively absorb all of the hydrogen chloride, while about 86% of the butane passed through the column unabsorbed. By lowering the dioxane throughput, the percentage of absorbed butane was decreased, however at the expense of a somewhat lower and incomplete absorption of the hydrogen chloride.

Somewhat similar results were also obtained when Chlorex (dichlor ethyl ether) and isopropyl ether were employed as the scrubbing agents. It is to be noted, however, that the separation of hydrogen chloride from mixtures thereof with the hydrocarbons was not as complete as when dioxane is employed. Nevertheless, these ethers showed good selectivity characteristics. In fact, by a proper control and selection of the operating conditions, these solvents may be efficiently employed for such recovery of anhydrous hydrogen halides from gaseous or vaporous mixtures comprising or containing these halides and organic compounds of the class described herein. For example, when operating under the above described conditions with Chlorex as the liquid anhydrous scrubbing agent or solvent, it was possible to remove substantially all of the hydrogen chloride from a mixture thereof with butane, while only a relatively small percentage of the butane was found to be dissolved in such solvent. In fact, with a substantially quantitative (100%) separation of the hydrogen chloride from the above-mentioned butane-HCl gaseous mixtures, the gaseous substance leaving the absorber comprised about 85% of the total butane introduced.

Although the above examples referred to the separation of hydrogen chloride from mixtures containing same. it is obvious that the present invention is applicable to the removal of other hydrogen halides, such as hydrogen bromide or hydrogen iodide, or of mixtures of the hydrogen halides, from gaseous or vaporous mixtures thereof with organic compounds of the type or class described above. Also, although the examples showed such scrubbing and separation of anhydrous hydrogen chloride from mixtures thereof with low boiling saturated aliphatic hydrocarbons, it is to be understood that the selective scrubbing with the above-defined liquid anhydrous solvents, and particularly with liquid anhydrous oxy-compounds and halogenated oxy-compounds of the type of ethers, di-ethers and halogenated derivatives thereof, may be effectively employed for the separation of the hydrogen halide or halides from mixtures thereof with a wide variety of organic compounds, such as the saturated and unsaturated aliphatic, alicyclic and aromatic hydrocarbons, and their halogenated derivatives. The present process finds particular adaptability for the separation and recovery of hydrogen halides in an anhydrous state from mixtures containing them and unsaturated hydrocarbons, such as propylene, butylenes, butadienes, cyclo-olefins, and the like, their homologues and analogues, as well as from mixtures which also contain halogenated hydrocarbons, such as allyl chloride, dichlorbutanes, and the like. As pointed out above, if desired, the gaseous or vaporous mixtures of the latter type, i. e. wherein hydrogen halides are commingled with both halogenated and non-halogenated hydrocarbons, may be first subjected to a preliminary treatment for the separation of the organic halides, the remaining gaseous or vaporous mixture being then subjected to scrubbing in accordance with the process of the present invention. Howeved, such pre-treatment is not necessary or essential since it is possible, according to the present process, to selectively absorb and separate the hydrogen halides from mixtures containing both the halogenated and non-halogenated hydrocarbons. In such a case, the unabsorbed hydrocarbon mixture may be subjected to treatment by any of the known processes for the separation thereof into its constituent components, or for the separate recovery of the halogenated hydrocarbons.

The extraction of the hydrogen halide should be effected under conditions whereby the mixture containing the organic compounds, such as the saturated and/or unsaturated hydrocarbons, and the hydrogen halide or halides is in a gaseous or vaporous state, while the anhydrous absorbing or scrubbing agent is present as a liquid. It is obvious, therefore, that the operating temperatures and pressures may vary within relatively wide limits, the desirable or optimum operating conditions depending, inter alia, on the character and nature of the mixture treated, percentage of hydrogen halides therein, specific scrubbing agent employed, ratio thereof to the treated mixture passing through the scrubber, etc., as this is readily determinable by one skilled in the art.

It was stated above that the hydrogen halide, separated from the mixtures thereof with organic compounds by extraction or scrubbing according to one phase of the present invention, may be subsequently recovered from the anhydrous scrubbing agent for example by ordinary heating. Nevertheless, it is possible, and sometimes even desirable, to employ directly the solution thus formed, i. e. the solution of the hydrogen halide in the solvent, without any preliminary separation of the hydrogen halide therefrom. This is particularly true in the case of reactions in which the presence of some inert diluent is desired. In such a case the anhydrous solvent of the described class, such as an ether, containing the hydrogen halide may be contacted directly with the compound to be subjected to the action of the hydrogen halide. The reaction mixture thus produced may then be treated for the separation and recovery of the selective solvent. The latter, as previously stated, may be re-used for scrubbing additional quantities of mixtures containing organic compounds and the hydrogen halides.

Instead of using a single anhydrous scrubbing agent of the above-defined class, such as a single ether, it is also possible to employ mixtures of such anhydrous solvents. Also, in some cases, it may be advisable to operate in a multi-stage scrubbing unit in which the same or different scrubbing agents, having similar or different degrees of selectivity are employed as the scrubbing agent or agents. Furthermore, such multi-stage units may be operated under the same or different solvent ratios, temperatures, pressures, and the like.

We claim as our invention:

1. A process for the separation of hydrogen halides from vaporous mixtures thereof with low boiling hydrocarbons, which comprises contacting said vaporous mixture with liquid dioxane thereby effecting the selective and substantially complete absorption of the hydrogen halide in said liquid dioxane, while the hydrocarbon vapors remain substantially unabsorbed therein, separately recovering the hydrocarbon vapors and the liquid dioxane solution containing the hydrogen halide, and recovering the hydrogen halide from said solution.

2. The process according to claim 1, wherein the vaporous mixture subjected to the scrubbing action of the liquid dioxane comprises hydrogen chloride and low boiling unsaturated aliphatic hydrocarbons.

3. A process for the separation of substantially anhydrous hydrogen halides from vaporous mixtures thereof with low boiling unsaturated hydrocarbons, which comprises contacting said vaporous mixture with liquid dichlorethyl ether thereby effecting a selective and substantially complete absorption of the hydrogen halide in said liquid ether, while the unsaturated hydrocarbon vapors remain substantially unabsorbed therein, separately removing the hydrocarbon vapors and the liquid ether solution containing the absorbed hydrogen halide, and recovering the hydrogen halide from said solution.

4. A continuous process for the separation of hydrogen halides from vaporous mixtures thereof with hydrocarbons, which comprises continuously conveying the vaporous mixture through a scrubbing zone in counter-current relationship to a stream of a liquid ether continuously conveyed through said zone, continuously removing the unabsorbed hydrocarbon vapors from said scrubbing zone, withdrawing from said scrubbing zone the ether solution containing the absorbed hydrogen halide, and recovering the extracted hydrogen halide from the withdrawn ether solution.

5. The process according to claim 4, wherein the ether freed from the absorbed hydrogen halide is recycled back into the scrubbing zone for the selective absorption and removal of hydrogen halide from fresh quantities of vapors containing said hydrogen halide and hydrocarbon vapors.

6. A process for the separation of hydrogen halides from a vaporous mixture containing a hydrogen halide and hydrocarbons, which comprises contacting said vaporous mixture with a liquid cyclo-aliphatic di-ether under conditions whereby substantial absorption of the hydrogen halide in said di-ether is effected while the hydrocarbon vapors remain substantially unaffected, separating the hydrogen halide-containing cyclo-aliphatic di-ether solution from the unabsorbed hydrocarbon vapors, and recovering the extracted hydrogen halide from said cyclo-aliphatic di-ether scrubbing liquid.

7. A process for the separation of hydrogen halides from a vaporous mixture containing a hydrogen halide and hydrocarbons, which comprises contacting said vaporous mixture with a liquid halogenated aliphatic ether under conditions whereby the hydrogen halide is substantially completely absorbed by said halogenated aliphatic ether, while the hydrocarbon vapors are substantially unaffected, separating the hydrogen halide-containing ether solution from the unabsorbed hydrocarbon vapors, and recovering the extracted hydrogen halide from said halogenated aliphatic ether solution.

8. The process according to claim 7 wherein the scrubbing liquid is a saturated halogenated aliphatic ether.

9. A process for the separation of hydrogen halides from a vaporous mixture containing a hydrogen halide and hydrocarbons, which comprises contacting said vaporous mixture with a liquid aliphatic ether under conditions whereby substantial absorption of the hydrogen halide in said aliphatic ether is effected while the hydrocarbon vapors are substantially unaffected, and separating the hydrogen halide-containing ether solution from the unabsorbed hydrocarbon vapors.

10. The process according to claim 9 wherein the scrubbing liquid is a saturated aliphatic ether.

11. A process for the separation of hydrogen halides from a vaporous mixture containing hydrogen halides and hydrocarbons, which comprises contacting said vaporous mixture with an ether in a liquid state, thereby effecting the selective absorption of the hydrogen halide in said ether, separating the enriched ether solution from the unabsorbed hydrocarbon vapors, and recovering the extracted hydrogen halide from the ether containing it.

12. The process according to claim 11 wherein the separation of the hydrogen halide from the ether by which it is absorbed is effected by heating the enriched ether solution to a temperature sufficient to evaporate the absorbed hydrogen halide but below that at which the ether boils.

13. A process for the separation of hydrogen halides from a vaporous mixture containing a hydrogen halide and organic compounds, which comprises contacting said vaporous mixture with an ether in a liquid state, thereby effecting the selective absorption of the hydrogen halide by said ether, thereafter removing the hydrogen halide containing ether solution from the unabsorbed organic compounds, and recovering the extracted hydrogen halide from said ether solution.

14. In a process for the separation of hydrogen halides from a vaporous mixture containing a hydrogen halide and organic compounds, the steps of contacting said vaporous mixture with an ether thereby effecting the selective absorption of the hydrogen halide by said ether, and removing the enriched ether from the unabsorbed vapors of the organic compounds.

15. In a process for the separation of substantially anhydrous hydrogen halide from a vaporous mixture containing hydrogen halide and hydrocarbons, the steps of contacting said vaporous mixture with a liquid anhydrous organic oxy-compound under conditions whereby substantially all of the hydrogen halide in the vaporous mixture is dissolved by said oxy-compound while leaving the hydrocarbon vapors substantially unaffected, separately removing the liquid phase, and recovering the substantially anhydrous hydrogen halide therefrom.

16. The process according to claim 15, wherein the liquid selective scrubbing agent employed for the selective recovery of the hydrogen halides is an anhydrous liquid organic halogenated oxy-compound.

17. In a process for the separation of substantially anhydrous hydrogen halide from vaporous mixtures containing hydrogen halide and hydrocarbons, the steps of contacting said vaporous mixtures with a liquid anhydrous organic oxy-compound under conditions whereby the hydrogen halide is selectively absorbed while the hydrocarbon vapors remain substantially unaffected, and separately recovering the absorbed hydrogen halide from said liquid oxy-compound.

WILLIAM ENGS.
HENRY W. DE JONG.